United States Patent
Bi et al.

(10) Patent No.: US 10,218,513 B2
(45) Date of Patent: Feb. 26, 2019

(54) METHOD AND TERMINAL FOR MESSAGE VERIFICATION

(71) Applicant: Huawei Technologies Co., Ltd., Shenzhen (CN)

(72) Inventors: Xiaoyu Bi, Shenzhen (CN); Jing Chen, Shenzhen (CN); Yixian Xu, Shenzhen (CN); Chunshan Xiong, Shenzhen (CN)

(73) Assignee: HUAWEI TECHNOLOGIE CO., LTD., Shenzhen (CN)

( * ) Notice: Subject to any disclaimer, the term of this patent is extended or adjusted under 35 U.S.C. 154(b) by 486 days.

(21) Appl. No.: 14/707,484

(22) Filed: May 8, 2015

(65) Prior Publication Data

US 2015/0244532 A1    Aug. 27, 2015

Related U.S. Application Data

(63) Continuation of application No. PCT/CN2012/084363, filed on Nov. 9, 2012.

(51) Int. Cl.
*H04L 9/32* (2006.01)
*H04W 12/10* (2009.01)
(Continued)

(52) U.S. Cl.
CPC .......... *H04L 9/3263* (2013.01); *H04L 9/3066* (2013.01); *H04L 9/3247* (2013.01);
(Continued)

(58) Field of Classification Search
None
See application file for complete search history.

(56) References Cited

U.S. PATENT DOCUMENTS

| 7,917,130 B1 | 3/2011 | Christensen et al. |
| 2011/0230202 A1 | 9/2011 | Wood et al. |

(Continued)

FOREIGN PATENT DOCUMENTS

| CN | 101361318 A | 2/2009 |
| CN | 101971652 A | 2/2011 |

(Continued)

OTHER PUBLICATIONS

LTE, "3$^{rd}$ Generation Partnership Project; Technical Specification Group Services and System Aspects; Security Aspects of Public Warning System (PWS); Release 12," Global System for Mobile Communications, 3GPP TR 33.869, V0.1.0, Jul. 2012, 43 pages.

(Continued)

*Primary Examiner* — Trang T Doan
(74) *Attorney, Agent, or Firm* — Brinks Gilson & Lione

(57) ABSTRACT

Embodiments of the present invention provide a method and a terminal for message verification, which can enhance timeliness of event message verification. The method includes: receiving an event message sent by a cell broadcast entity; obtaining a public key of a CA according to pre-configured information for determining the public key of the CA and information for determining the public key of the CA and obtained from a network side, or according to information of the CA obtained from the network side; then, obtaining a public key of the cell broadcast entity according to the obtained public key of the CA and an implicit certificate of the cell broadcast entity; verifying a signature of the cell broadcast entity over the event message according to the public key of the cell broadcast entity; and finally, determining legitimacy of the event message according to the verification result.

8 Claims, 8 Drawing Sheets

(51) Int. Cl.
*H04L 9/30* (2006.01)
*H04L 29/06* (2006.01)
*H04W 4/90* (2018.01)

(52) U.S. Cl.
CPC ........ *H04L 9/3268* (2013.01); *H04L 63/0823* (2013.01); *H04L 63/126* (2013.01); *H04W 4/90* (2018.02); *H04W 12/10* (2013.01)

(56) References Cited

U.S. PATENT DOCUMENTS

| | | | |
|---|---|---|---|
| 2012/0233457 A1 | 9/2012 | Zaverucha | |
| 2013/0036303 A1* | 2/2013 | Himawan | H04L 9/3268 713/158 |
| 2013/0185561 A1* | 7/2013 | Brusilovsky | H04W 4/90 713/170 |
| 2013/0246785 A1* | 9/2013 | Buckley | H04L 9/3242 713/156 |
| 2013/0246798 A1* | 9/2013 | Buckley | H04L 9/3247 713/176 |
| 2013/0278385 A1* | 10/2013 | Baskin | H04L 63/0823 340/7.51 |
| 2015/0044984 A1 | 2/2015 | Sammour et al. | |
| 2015/0296375 A1* | 10/2015 | Horn | H04W 4/90 455/411 |

FOREIGN PATENT DOCUMENTS

| | | |
|---|---|---|
| CN | 102215111 A | 10/2011 |
| CN | 102440012 A | 5/2012 |
| CN | 102611553 A | 7/2012 |
| JP | H10-105612 A | 4/1998 |
| JP | 2003-258786 A | 9/2003 |
| JP | 2006-311621 A | 11/2006 |
| JP | 2009-296576 A | 12/2009 |
| WO | WO 2012/108803 A1 | 8/2012 |

OTHER PUBLICATIONS

ITU-T, "Series X: Data Networks, Open System Communications and Security," Information Technology—Open Systems Interconnection—The Directory: Public-key and attribute Certificate Frameworks, Recommendation ITU-T X.509, International Telecommunications Union, Oct. 2012, 208 pages.

Research in Motion UK Ltd., "pCR: Certificate Authorities," Agenda Item 7.10, 3GPP TSG SA WG3 Security—SA3#70, Sophia Antipolis, France, S3-130108, Jan. 2012, 4 pages.

\* cited by examiner

METHOD AND TERMINAL FOR MESSAGE VERIFICATION

CROSS-REFERENCE TO RELATED APPLICATIONS

This application is a continuation of International Application No. PCT/CN2012/084363, filed on Nov. 9, 2012, which is hereby incorporated by reference in its entirety.

TECHNICAL FIELD

The present invention relates to the field of communications and, in particular, to a method and a terminal for message verification.

BACKGROUND

A PWS is a public warning system alerting to natural disasters or man-made accidents that may cause damages to human life and properties. A PWS service is provided by a telecom operator to a user, contents thereof may be provided by a warning message providing department. When a public warning event occurs, the warning message providing department generates a warning message and sends the same to operators. The operators use their network to send the warning message to user terminals. Since a message released by the PWS may cause a mass panic, requirements for security are very high. According to the security requirements of the PWS, a security mechanism should identify a sending source of a warning notification, thereby preventing a false warning notification, and protecting the integrity of the warning notification.

In the prior art, the sending source of the warning notification is identified via the following method, so that the false warning notification is prevented and the integrity of the warning notification is protected:

firstly, multiple global certification authorities (CAs) are deployed in the world, and public keys of these CAs are configured in a terminal;

secondly, a cell broadcast entity (CBE) obtains an implicit certificate from a CA periodically, that is, the CA issues the implicit certificate for the cell broadcast entity;

then, when a public warning event occurs, the cell broadcast entity broadcasts a message of the PWS to a warning location;

after receiving the message released by the PWS, firstly, the user terminal calculates a public key of the cell broadcast entity according to the public keys of the CAs saved locally and the implicit certificate in the message of the PWS;

and then verifies a signature of the cell broadcast entity over the message of the PWS via the public key of the cell broadcast entity, thus verifying the validity of the PWS message.

However, when multiple CAs are configured in the user terminal, after receiving the message of the PWS, since there isn't information for determining the CA in the implicit certificate, the user terminal cannot know which CA the received implicit certificate belongs to, or the user terminal does not know the public key of which CA should be used to complete verification of the PWS message. Thus, the user terminal can only try one by one, in this case, it is likely that the user terminal cannot obtain a correct key until the last one is tried, which greatly influences the timeliness of verification of the PWS message.

SUMMARY

Embodiments of the present invention provide a method and a terminal for message verification, which can improve the timeliness of event message verification.

In order to achieve the objective above, the embodiments of the present invention employ the following technical solutions:

In a first aspect, a method for message verification is provided, the method includes:

receiving an event message sent by a cell broadcast entity, where the event message carries a signature of the cell broadcast entity over the event message and an implicit certificate issued by a certification authority (CA) to the cell broadcast entity;

obtaining, according to pre-configured information for determining a public key of the CA and information for determining the public key of the CA and obtained from a network side, or according to information of the CA obtained from the network side, the public key of the CA;

obtaining, according to the obtained public key of the CA and the implicit certificate of the cell broadcast entity, a public key of the cell broadcast entity;

verifying, according to the public key of the cell broadcast entity, the signature of the cell broadcast entity over the event message; and determining, according to a result of the verifying, legitimacy of the event message.

In a first possible implementation form according to the first aspect, the implicit certificate carries identification information of the cell broadcast entity;

the pre-configured information for determining the public key of the CA specifically includes:

a corresponding relationship between the identification information of the cell broadcast entity and the information of the CA;

the obtaining, according to pre-configured information for determining a public key of the CA and information for determining the public key of the CA and obtained from a network side, the public key of the CA, specifically includes:

obtaining, according to the identification information of the cell broadcast entity carried by the implicit certificate and the pre-configured corresponding relationship between the identification information of the cell broadcast entity and the information of the CA, the information of the CA corresponding to the identification information of the cell broadcast entity, and further obtaining the public key of the CA for verifying the event message received.

In a second possible implementation form according to the first aspect, the information for determining the public key of the CA and obtained from the network side is specifically information of a geographical position of the cell broadcast entity;

the pre-configured information for determining the public key of the CA specifically includes:

a corresponding relationship between information of a geographical position of the CA and the information of the CA;

the obtaining, according to pre-configured information for determining a public key of the CA and information for determining the public key of the CA and obtained from the network side, the public key of the CA, specifically includes:

obtaining, according to the information of the geographical position of the cell broadcast entity, the information of the geographical position of the CA;

obtaining, according to the obtained information of the geographical position of the CA and the pre-configured corresponding relationship between the information of the geographical position of the CA and the information of the CA, the information of the CA corresponding to the geographical position of the CA, and further obtaining the public key of the CA.

In a third possible implementation form according to the first aspect, the information of the CA obtained from the network side includes: information of the CA obtained from a core network entity or an access network entity or a network side server during a terminal accesses to a network;

or the event message further carries the information of the CA;

the information of the CA obtained from the network side includes: information of the CA obtained from the information of the CA further carried in the event message.

In a fourth possible implementation form according to the first aspect or the first to third possible implementation forms, the information of the CA includes an identification of the CA, or an identification of the public key of the CA, or the public key of the CA.

In a second aspect, a terminal for message verification is provided, the terminal includes a receiver and a processor;

the receiver is configured to receive an event message sent by a cell broadcast entity, and send the event message to the processor, where the event message carries a signature of the cell broadcast entity over the event message and an implicit certificate issued by a certification authority (CA) to the cell broadcast entity;

the processor is configured to receive the event message sent by the receiver, and obtain, according to pre-configured information for determining a public key of the CA and information for determining the public key of the CA and obtained from a network side, or according to information of the CA obtained from the network side, the public key of the CA;

the processor is further configured to obtain, according to the obtained public key of the CA and the implicit certificate of the cell broadcast entity, a public key of the cell broadcast entity;

the processor is further configured to verify, according to the public key of the cell broadcast entity, the signature of the cell broadcast entity over the event message; and the processor is further configured to, according to a result of the verifying, determine and verify legitimacy of the event message.

In a first possible implementation form according to the second aspect, the implicit certificate further carries identification information of the cell broadcast entity;

the pre-configured information for determining the public key of the CA specifically includes:

a corresponding relationship between the identification information of the cell broadcast entity and the information of the CA;

the obtaining, by the processor, according to pre-configured information for determining a public key of the CA and information for determining the public key of the CA and obtained from a network side, the public key of the CA, specifically includes:

obtaining, according to the identification information of the cell broadcast entity carried by the implicit certificate and the pre-configured corresponding relationship between the identification information of the cell broadcast entity and the information of the CA, the information of the CA corresponding to the identification information of the cell broadcast entity, and further obtaining the public key of the CA.

In a second possible implementation form according to the second aspect, the information for determining the public key of the CA and obtained from the network side is specifically information of a geographical position of the cell broadcast entity;

the pre-configured information for determining the public key of the CA specifically includes:

a corresponding relationship between information of a geographical position of the CA and the information of the CA;

the obtaining, by the processor, according to pre-configured information for determining a public key of the CA and information for determining the public key of the CA and obtained from the network side, the public key of the CA, specifically includes:

obtaining, according to the information of the geographical position of the cell broadcast entity, the information of the geographical position of the CA;

obtaining, according to the obtained information of the geographical position of the CA and the pre-configured corresponding relationship between the information of the geographical position of the CA and the information of the CA, the information of the CA corresponding to the geographical position of the CA, and further obtaining the public key of the CA.

In a third possible implementation form according to the second aspect, the information of the CA obtained from the network side includes: information of the CA obtained from a core network entity, or an access network entity, or a network side server, during the terminal accesses the network;

or the event message further carries the information of the CA;

the information of the CA obtained from the network side further includes: information of the CA obtained from the information of the CA further carried in the event message.

In a fourth possible implementation form according to the second aspect or the first to third possible implementation forms, the information of the CA includes an identification of the CA, or an identification of the public key of the CA, or a public key of the CA.

Embodiments of the present invention provide a method and a terminal for message verification. In the method, after receiving an event message sent by a cell broadcast entity, a public key of a CA is obtained according to pre-configured information for determining the public key of the CA and information for determining the public key of the CA and obtained from a network side, or according to information of the CA obtained from the network side; then, a public key of the cell broadcast entity is obtained according to the obtained public key of the CA and an implicit certificate of the cell broadcast entity; then a signature of the cell broadcast entity over the event message is verified according to the public key of the cell broadcast entity; and finally, legitimacy of the event message is determined according to a result of the verifying.

In this method, since a terminal is pre-configured with information for determining the public key of the CA, or the terminal may obtain the information for determining the public key of the CA from a network side, and thus, the terminal can perform event message verification after determining the public key of the CA according to the information for determining the public key of the CA, instead of searching the public key of the CA by trying one by one when not knowing which CA's public key to use to complete the event message verification. Therefore, the time is saved, and the timeliness of the event message verification is improved.

BRIEF DESCRIPTION OF DRAWINGS

In order to make technical solutions in embodiments of the present invention or the prior art more clearly, accompanying drawings used for description of embodiments of the present invention or the prior art will be briefly described hereunder. Obviously, the described drawings are merely some embodiments of the present invention. For persons skilled in the art, other drawings may be obtained based on these drawings without any inventive efforts.

DESCRIPTION OF EMBODIMENTS

Technical solutions in embodiments of the present invention will be described clearly and comprehensively hereunder with reference to accompanying drawings in the embodiments of the present invention. Obviously, the described embodiments are merely some embodiments of the present invention, rather than all embodiments of the present invention. All other embodiments obtained by persons of ordinary skill in the art based on embodiments of the present invention without any inventive efforts shall fall within the protection scope of the present invention.

Embodiment 1

Figure 1:
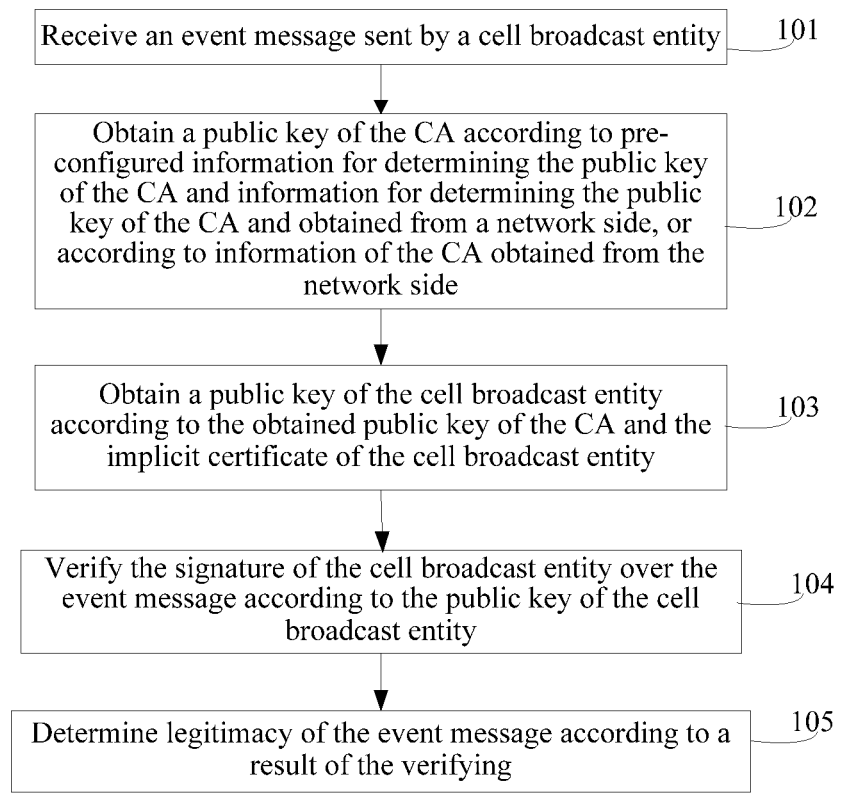
FIG. 1 is a schematic flow chart of a method for message verification provided by an embodiment of the present invention.

An embodiment of the present invention provides a method for message verification, as shown in FIG. 1, the method specifically includes:

101, receive an event message sent by a cell broadcast entity, where the event message carries a signature of the cell broadcast entity over the event message and an implicit certificate issued by a certification authority CA to the cell broadcast entity.

The event message may be a public warning message or other messages carrying the implicit certificate, which is not limited by the embodiments of the present invention specifically.

The implicit certificate issued by the CA to the cell broadcast entity is used to obtain a public key of the cell broadcast entity; the signature of the cell broadcast entity over the event message is used to verify the legitimacy of the event message.

102, obtain a public key of the CA according to pre-configured information for determining the public key of the CA and information for determining the public key of the CA and obtained from a network side, or according to information of the CA obtained from the network side.

The public key of the CA may be obtained according to the pre-configured information for determining the public key of the CA and the information for determining the public key of the CA and obtained from the network side, and the public key of the CA may also be obtained according to the information of the CA obtained from the network side.

The pre-configured information for determining the public key of the CA may be a corresponding relationship between identification information of the cell broadcast entity and the information of the CA, at this time it needs to combine with the identification information of the cell broadcast entity obtained from the network side to obtain the public key of the CA; may also be a corresponding relationship between information of a geographical position of the CA and the information of the CA, at this time, it needs to combine with information of a geographical position of the cell broadcast entity obtained from the network side to obtain the public key of the CA; may also be other pre-configured information, as long as the public key of the CA could be determined by the pre-configured information, this is not limited by embodiments of the present invention specifically.

The information of the CA obtained from the network side may be: information of the CA obtained from a core network entity or an access network entity or a network side server during a terminal accesses a network, may also be information of the CA obtained from the information of the CA also carried in the event message sent by the cell broadcast entity, and may also be obtained from other network devices having the information of the CA; as long as the network side has the information of the CA, the terminal can obtain the information of the CA, this is not limited by embodiments of the present invention. The public key of the CA may be determined according to the information of the CA.

The core network entity may be different depending on application scenarios, which may be a mobility management entity (MME) in an LTE network, and may also be a mobile switching center (MSC) in a GSM network or a core network entity in other networks; this is not limited by the embodiments of the present invention specifically.

The access network entity may be a base station, which is not limited by the embodiments of the present invention specifically.

The information of the CA may be an ID identification of the CA, and may also be an identification of the public key of the CA, or the public key of the CA, which is not limited by the embodiments of the present invention specifically.

103, obtain a public key of the cell broadcast entity according to the obtained public key of the CA and the implicit certificate of the cell broadcast entity.

The public key of the cell broadcast entity may be calculated via an operation between the public key of the CA and the implicit certificate of the cell broadcast entity, and then the public key of the cell broadcast entity is obtained.

104, verify the signature of the cell broadcast entity over the event message according to the public key of the cell broadcast entity.

105, determine legitimacy of the event message according to a result of the verifying.

If the obtained public key of the cell broadcast entity is consistent with the signature of the cell broadcast entity over the event message, then it is determined that the event message is legitimate. A terminal may choose to inform a user of the event message in a way of displaying on the terminal, and may also inform the user in a way of an alarm ring, the embodiments of the present invention are intended to verify whether the event message is legitimate, and will not limit ways hereafter specifically.

If the obtained public key of the cell broadcast entity is not consistent with the signature of the cell broadcast entity over the event message, then it is determined that the event message is not legitimate. A terminal may choose not to process the event message, which is not limited by the embodiments of the present invention specifically.

It should be noted herein, this method may be applicable to not only the verification of the message of the PWS, but also applicable to any scenario where signature information is not included in the implicit certificate.

The embodiment of the present invention provides a method for message verification. In the method, after an event message sent by a cell broadcast entity is received, a public key of a CA is obtained according to pre-configured information for determining the public key of the CA and information for determining the public key of the CA obtained from a network side, or according to information of the CA obtained from the network side; then, a public key of the cell broadcast entity is obtained according to the obtained public key of the CA and an implicit certificate of the cell broadcast entity; then a signature of the cell broadcast entity over the event message is verified according to the public key of the cell broadcast entity; and finally, legitimacy of the event message is determined according to the verification result.

In this method, since a terminal is pre-configured with the information for determining the public key of the CA, or the terminal may obtain the information for determining the public key of the CA from the network side, thus, the terminal can determine the public key of the CA according to the information for determining the public key of the CA and then perform event message verification, instead of searching the public key of the CA by trying one by one when not knowing which CA's public key to use to complete the event message verification. Therefore, the time is saved, and the timeliness of the event message verification is improved.

Embodiment 2

Figure 2:
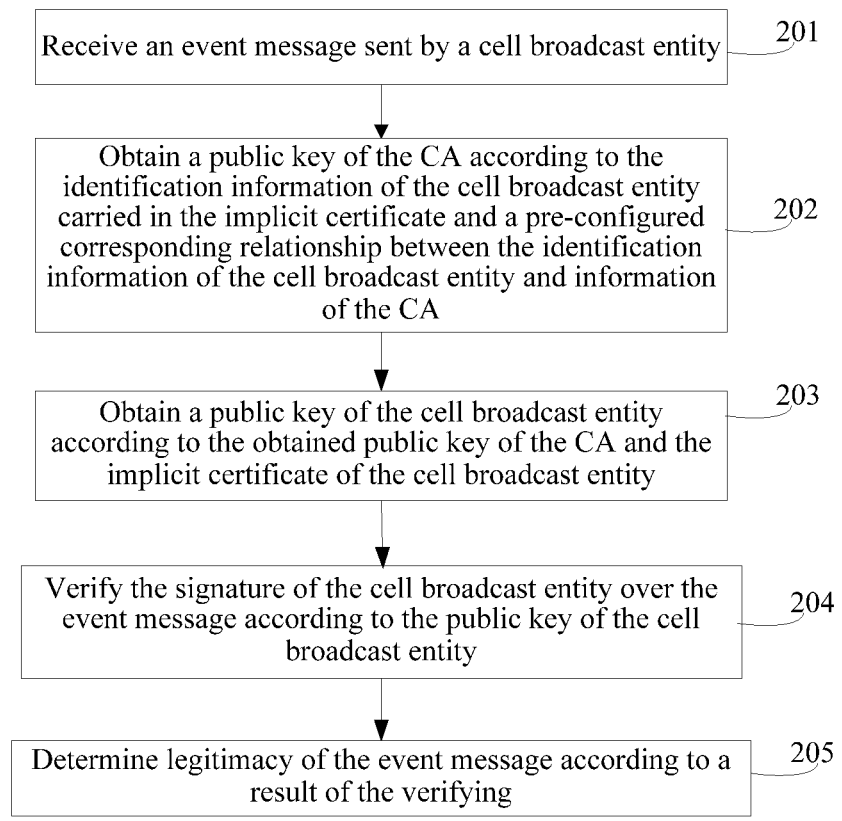
FIG. 2 is a schematic flow chart of another method for message verification provided by an embodiment of the present invention.

An embodiments of the present invention further provides a method for message verification, the method is described by taking a corresponding relationship between identification information of a cell broadcast entity and information of a CA as pre-configured information for determining a public key of the CA, as shown in FIG. 2, the method specifically includes:

201, receive an event message sent by a cell broadcast entity, where the event message carries a signature of the cell broadcast entity over the event message and an implicit certificate issued by a certification authority CA to the cell broadcast entity, and the implicit certificate carries identification information of the cell broadcast entity.

The identification information of the cell broadcast entity is used to obtain a public key of the CA in combination with pre-stored information for determining the public key of the CA; the implicit certificate issued by the CA to the cell broadcast entity is used to obtain a public key of the cell broadcast entity; the signature of the cell broadcast entity over the event message is used to verify legitimacy of the event message.

202, obtain a public key of the CA according to the identification information of the cell broadcast entity carried in the implicit certificate and a pre-configured corresponding relationship between the identification information of the cell broadcast entity and information of the CA.

The identification information of the cell broadcast entity may be an ID identification of the cell broadcast entity, and may also be a name of the cell broadcast entity; the information of the CA may be an ID identification of the CA, and may also be identification of the public key of the CA, or the public key of the CA, which is not specifically limited by the embodiments of the present invention.

Specifically, the terminal may be pre-configured with the corresponding relationship between the identification information of the cell broadcast entity and the information of the CA in the terminal in a way of storing a table.

For instance, if the identification information of the cell broadcast entity is the ID identification and the information of the CA is the ID identification of the CA, a correlation as shown in table 1 may be established:

TABLE 1

| R1 | CBE1 ID | CA1 ID |
| R2 | CBE2 ID | CA2 ID |
| R3 | CBE3 ID | CA3 ID |
| ... | ... | ... |
| Rn | CBEn ID | CAn ID |

After receiving the event message sent by the cell broadcast entity, since information of a CBE ID is carried in the implicit certificate carried by the event message, thus information of a corresponding CA ID may be obtained by retrieving the table, and further, the public key of the CA is obtained via table 2 pre-configured in the terminal.

TABLE 2

| R1 | CA1 ID | public key of CA1 |
| R2 | CA2 ID | public key of CA2 |
| R3 | CA3 ID | public key of CA3 |
| ... | ... | ... |
| Rn | CAn ID | public key of CAn |

Certainly, in the pre-configured corresponding relationship between the identification information of the cell broadcast entity and the information of the CA, the information of the CA may also be an identification of the public key of the CA or the public key of the CA or the like, the public key of the CA may be obtained finally by searching the pre-stored corresponding relationship table, which will not be repeated herein.

203, obtain a public key of the cell broadcast entity according to the obtained public key of the CA and the implicit certificate of the cell broadcast entity.

The public key of the cell broadcast entity may be calculated via an operation between the public key of the CA and the implicit certificate of the cell broadcast entity, and then the public key of the cell broadcast entity is obtained.

204, verify the signature of the cell broadcast entity over the event message according to the public key of the cell broadcast entity.

205, determine legitimacy of the event message according to a result of the verifying.

If the obtained public key of the cell broadcast entity is consistent with the signature of the cell broadcast entity over the event message, then it is determined that the event message is legitimate. A terminal may choose to inform a user of the event message in a way of displaying on the terminal, and may also inform the user in a way of an alarm ring, the embodiments of the present invention are intended to verify whether the event message is legitimate, and will not limit ways hereafter specifically.

If the obtained public key of the cell broadcast entity is not consistent with the signature of the cell broadcast entity over the event message, then it is determined that the event message is not legitimate. A terminal may choose not to process the event message, which is not limited by the embodiments of the present invention specifically.

Figure 3:
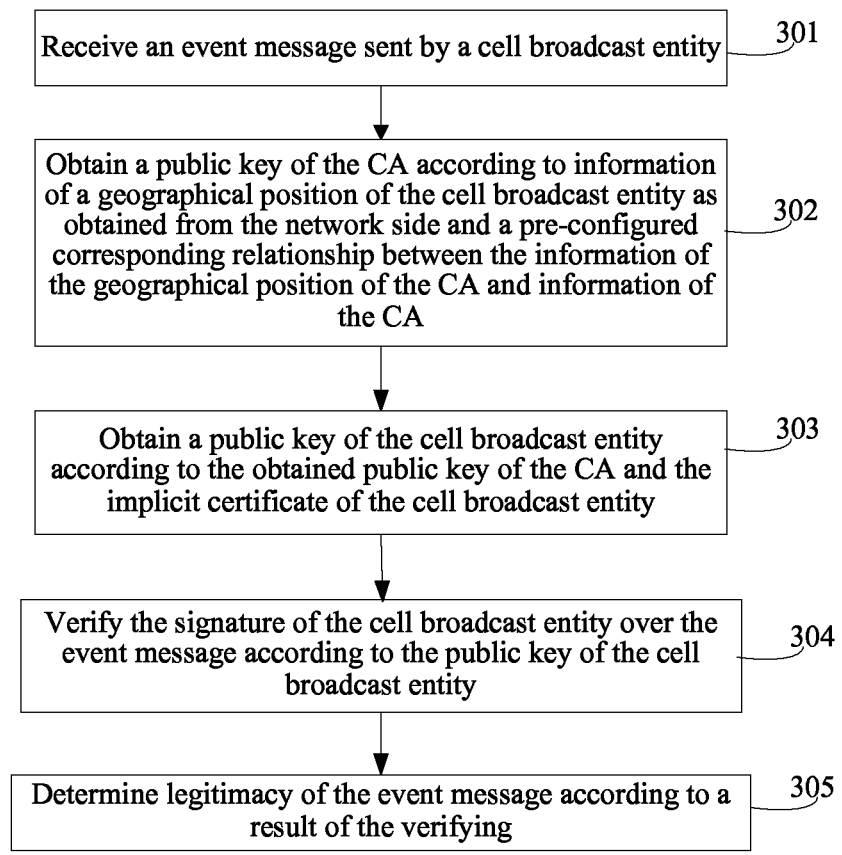
FIG. 3 is a schematic flow chart of still another method for message verification provided by an embodiment of the present invention.

An embodiment of the present invention further provides a method for message verification, the method is described by taking a corresponding relationship between information of a geographical position of a CA and information of the CA as pre-configured information for the public key of the CA, as shown in FIG. 3, the method specifically includes:

301, receive an event message sent by a cell broadcast entity, where the event message carries a signature of the cell broadcast entity over the event message and an implicit certificate issued by a CA to the cell broadcast entity.

Information of a geographical position of the cell broadcast entity is used to obtain a public key of the CA; the implicit certificate issued by the CA to the cell broadcast entity is used to obtain a public key of the cell broadcast entity; and the signature of the cell broadcast entity over the event message is used to verify legitimacy of the event message.

302, obtain a public key of the CA according to information of a geographical position of the cell broadcast entity as obtained from the network side and a pre-configured corresponding relationship between the information of the geographical position of the CA and information of the CA.

The information of the geographical position of the cell broadcast entity as obtained from the network side may be warning region information carried by the event message, and may also be information obtained via a cell selection or a PLMN selection during a terminal accesses a network, which is not limited by the embodiments of the present invention specifically.

The CA may be divided according to different territories, for instance, being divided according to standards such as different continents, different regions of different continents, different countries, or different provinces of a country. Therefore, if the terminal may determine, according to the geographical position of network in which it locates, a CA corresponding to the region, it may also determine the public key of the CA.

For instance, taking each country as a basic unit, one CA is set for each country, if information of a geographical position of a cell broadcast entity, which is carried in an event message received by a terminal is Xi'an, then it can be determined that the information of the geographical position of the CA uniquely corresponding thereto is China, the public key of the CA may be determined according to pre-configured table 3.

TABLE 3

| R1 | China | public key of CA1 |
| R2 | The United States | public key of CA2 |
| R3 | France | public key of CA3 |
| ... | ... | ... |
| Rn | Germany | public key of CAn |

Certainly, in the corresponding relationship between the information of the geographical position of the CA and the information of the CA, the information of the CA may also be an ID identification of the CA, in such a case, it needs to search the corresponding relationship table to obtain ID identification information of the CA firstly, and then obtain information of the public key of the CA via the table shown as table 2, or the information of the CA may also be an identification of the public key of the CA or the like, the information of the public key of the CA may be obtained finally by searching the relationship table stored, which will not be repeated in the embodiments of the present invention.

303, obtain a public key of the cell broadcast entity according to the public key of the CA obtained and the implicit certificate of the cell broadcast entity.

The public key of the cell broadcast entity may be calculated via an operation between the public key of the CA and the implicit certificate of the cell broadcast entity, and then the public key of the cell broadcast entity is obtained.

304, verify the signature of the cell broadcast entity over the event message, according to the public key of the cell broadcast entity.

305, determine legitimacy of the event message according to the verification result.

If the obtained public key of the cell broadcast entity is consistent with the signature of the cell broadcast entity over the event message, then it is determined that the event message is legitimate. A terminal may choose to inform a user of the event message by a way of displaying on the terminal, and may also inform the user in a way of an alarm ring, the embodiments of the present invention are intended to verify whether the event message is legitimate, and will not limit ways hereafter specifically.

If the obtained public key of the cell broadcast entity is not consistent with the signature of the cell broadcast entity over the event message, then it is determined that the event message is not legitimate. A terminal may choose not to process the event message, which is not limited by the embodiments of the present invention specifically.

Figure 4:
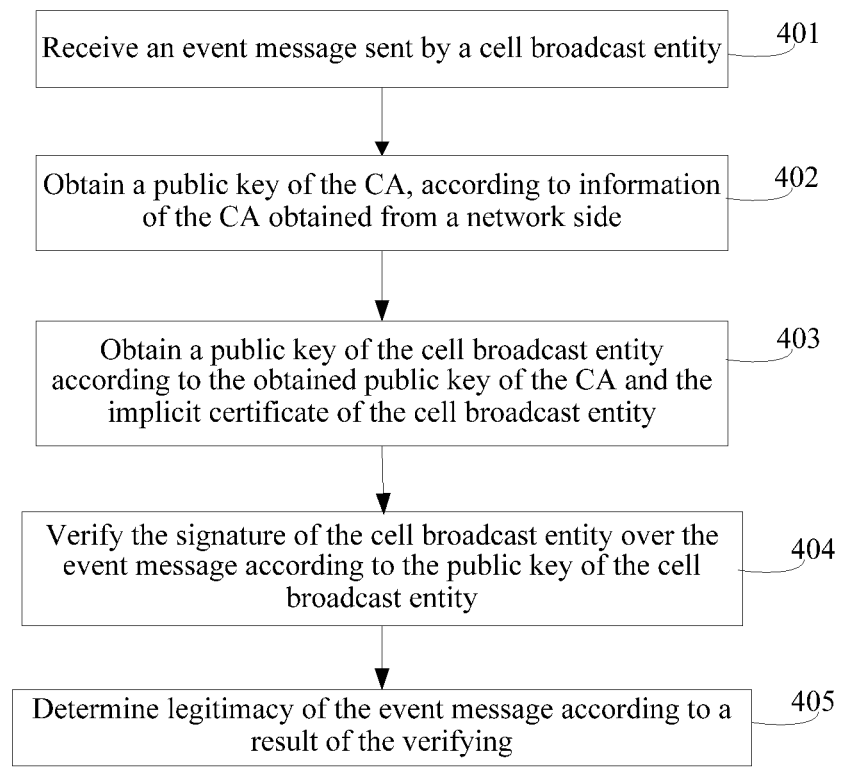
FIG. 4 is a schematic flow chart of still another method for message verification provided by an embodiment of the present invention.

An embodiment of the present invention also provides a method for message verification, the method is described in a case where a public key of a CA is determined according to information of the CA obtained from a network side, as shown in FIG. 4, the method specifically includes:

401, receive an event message sent by a cell broadcast entity, where the event message carries a signature of the cell broadcast entity over the event message and an implicit certificate issued by a CA to the cell broadcast entity.

The implicit certificate issued by the CA to the cell broadcast entity is used to obtain a public key of the cell broadcast entity; and the signature of the cell broadcast entity over the event message is used to verify legitimacy of the event message.

402, obtain a public key of the CA, according to information of the CA obtained from a network side.

The information of the CA obtained from the network side may be: information of the CA obtained from a core network entity or an access network entity or a network side server during a terminal accesses the network, may also be information of the CA obtained from the information of the CA further carried in the event message sent by the cell broadcast entity, and may also be obtained from other network devices having the information of the CA, as long as the network side has the information of the CA, the terminal can obtain the information of the CA, this is not limited by embodiments of the present invention specifically.

The core network entity may be different according to different application scenarios, which may be an MME in a LTE network, and may also be an MSC in a GSM network or a core network entity in other networks, which is not limited by the embodiments of the present invention specifically.

The access network entity may be a base station, which is not limited by the embodiments of the present invention specifically.

The information of the CA may be an ID identification of the CA, and may also be an identification of a public key of the CA or a public key of the CA, which is not limited by embodiments of the present invention specifically.

403, obtain a public key of the cell broadcast entity according to the obtained public key of the CA and the implicit certificate of the cell broadcast entity.

The public key of the cell broadcast entity may be calculated via an operation between the public key of the CA and the implicit certificate of the cell broadcast entity, and then the public key of the cell broadcast entity is obtained.

404, verify the signature of the cell broadcast entity over the event message according to the public key of the cell broadcast entity.

405, determine legitimacy of the event message according to a result of the verifying.

If the obtained public key of the cell broadcast entity is consistent with the signature of the cell broadcast entity over the event message, then it is determined that the event message is legitimate. A terminal may choose to inform a user of the event message in a way of displaying on the terminal, and may also inform the user in a way of an alarm ring, the embodiments of the present invention are intended to verify whether the event message is legitimate, and will not limit ways hereafter specifically.

If the obtained public key of the cell broadcast entity is not consistent with the signature of the cell broadcast entity over the event message, then it is determined that the event message is not legitimate. A terminal may choose not to process the event message, which is not limited by the embodiments of the present invention specifically.

Specifically, the information of the CA obtained from the network side may be: information of a CA obtained from a core network entity when a terminal accesses a network.

Figure 5:
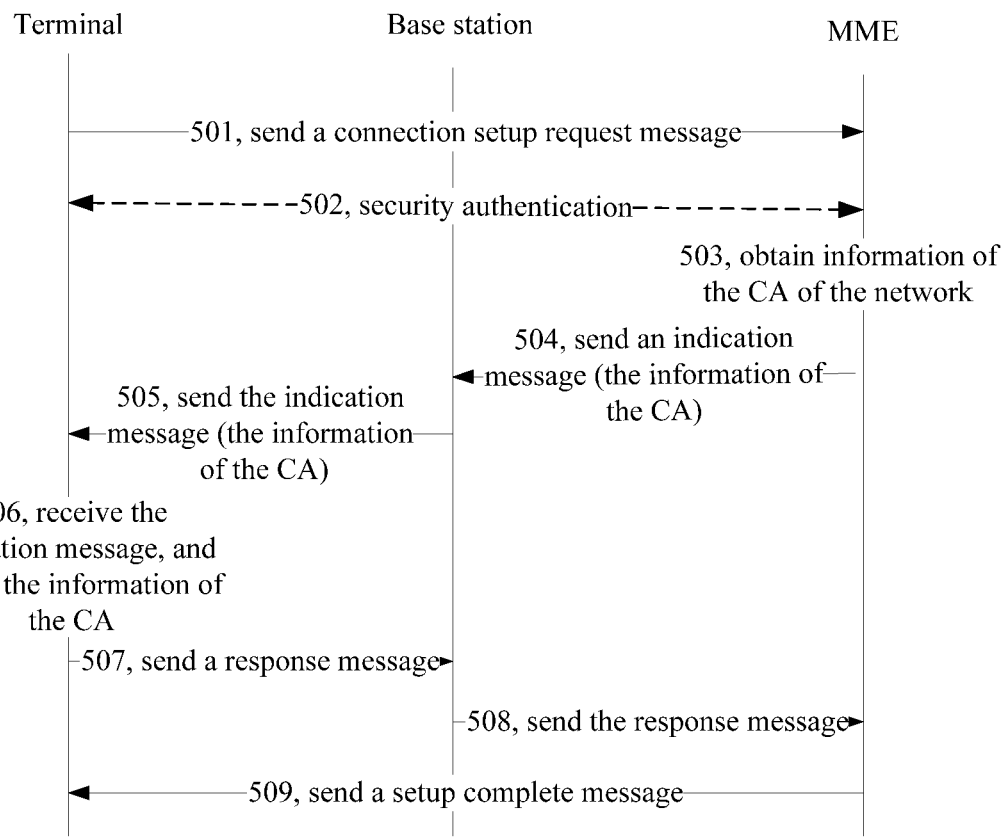
FIG. 5 is a schematic flow chart of obtaining information of a CA by a terminal from a core network entity of a network where the terminal locates.

When the terminal accesses the network, if the core network entity is specifically a mobility management entity MME, then a process for obtaining the information of the CA from the MME is as shown in FIG. 5, including:

501, a terminal sends a connection setup request message to the MME.

When the terminal moves to a network and needs to get access to the network, then the terminal will send a connection setup request message to the MME, the connection setup request message may be specifically an attach request message which requests to be attached to the network; and may also be a location update request message which requests a location update. Different types of messages are selected according to different application scenarios, which will not be limited by embodiments of the present invention specifically.

502, the terminal performs a security authentication with the MME.

503, the mobility management entity obtains information of the CA of the network.

Certainly, this is not to say that the MME obtains the information of the CA of the network only after the terminal gets access to the network and completes the security authentication, instead the information of the CA exists in the MME in advance, which may be pre-configured in the MME or may be obtained by the MME from elsewhere, this is not limited by this embodiment specifically.

504, the MME sends indication information to a base station, where the indication information carries the information of the CA.

Corresponding indication messages are selected according to different application scenarios, which will not be limited by the embodiment of the present invention specifically. In the embodiment of the present invention, the indication message sent by the MME to the base station may be an NAS SMC message.

505, the base station forwards the indication message to the terminal, where the indication message carries the information of the CA.

506, the terminal receives the indication message, and obtains the information of the CA.

507, the terminal sends a response message to the base station.

508, the base station sends the response message to the MME.

509, the MME sends a connection setup complete message to the terminal.

If, in step 501, the data connection setup request message sent is an attach request message, then in step 509, the data connection setup complete message sent is an attach accept message;

If, in step 501, the data connection setup request message sent is a location update request message, then in step 509, the data connection setup complete message sent is a location update accept message.

Certainly, the information of the CA may not be carried in step 504 and step 505, instead the information of the CA is carried in step 509, the embodiments of the present invention will not make a limitation thereto specifically, only describe that the information of the CA is obtained from the core network entity of the network when the terminal accesses the network.

Optionally, the information of the CA obtained from the network side may be: information of the CA obtained from an access network entity when the terminal accesses the network.

Figure 6:
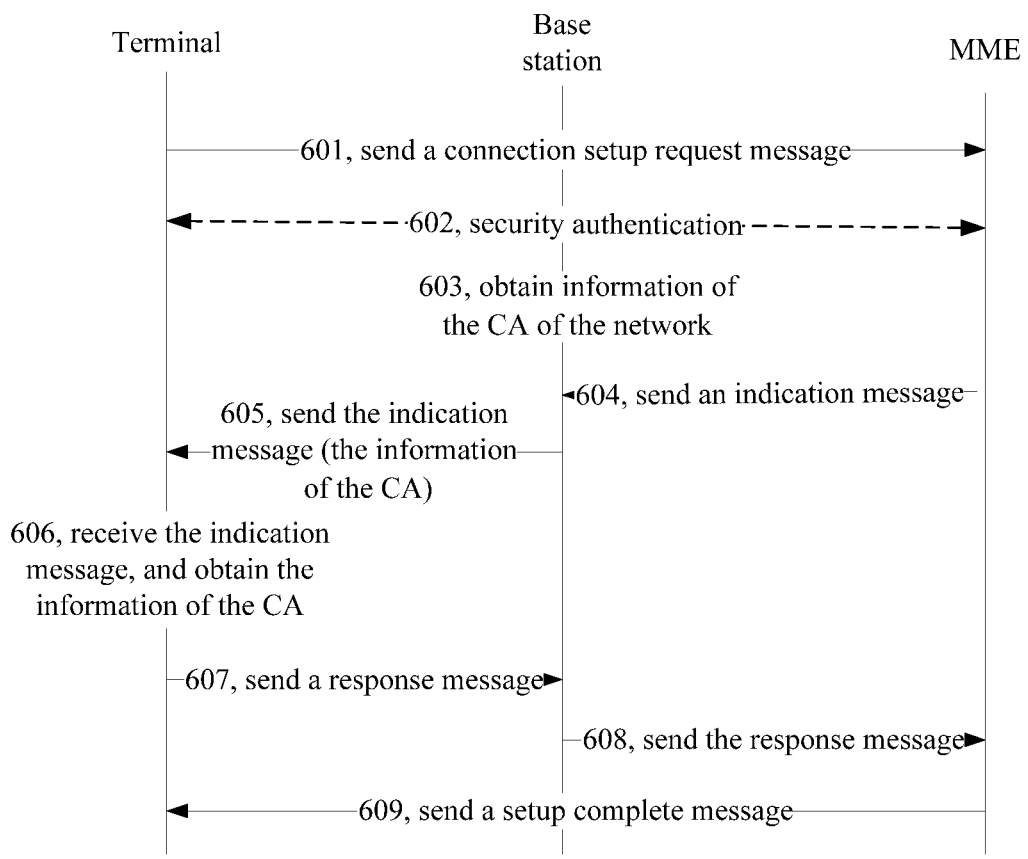
FIG. 6 is a schematic flow chart of obtaining information of a CA by a terminal from an access network entity of a network where the terminal locates.

If the access network entity is specifically a base station, the core network entity of the network is an MME, then when the terminal accesses the network, a process for obtaining the information of the CA from the base station is as shown in FIG. 6, including:

601, the terminal sends a connection setup request message to the MME.

602, the terminal performs a security authentication with the MME.

603, the base station obtains information of a CA of the network.

Certainly, this is not to say that the base station obtains information of the CA of the network only after the terminal gets access to the network and completes the security authentication, instead the information of the CA exists in the base station in advance, which may be pre-configured in the base station or may be obtained by the base station from elsewhere, this is not limited by this embodiment specifically.

604, the MME sends indication information to the base station, where the indication message requests the base station to send the information of the CA to the terminal

605, the base station sends the indication message to the terminal, where the indication message carries the information of the CA.

Corresponding indication messages are selected according to different application scenarios, which will not be limited by the embodiment of the present invention specifically. In the embodiment of the present invention, the indication message may be an AS SMC message.

606, the terminal receives the indication message, and obtains the information of the CA.

607, the terminal sends a response message to the base station.

608, the base station sends the response message to the MME.

609, the MME sends a connection setup complete message to the terminal

For the type of the connection setup request message, the connection setup response message and the indication message, reference may be made to the description of the embodiment as shown in FIG. 5, which will not be repeated in this embodiment.

Certainly, in the process of obtaining the information of the CA from the base station, there may not be a trigger message in step 604, instead the base station sends the indication message to the terminal according to information locally configured, which is not limited by this embodiment specifically.

Optionally, the information of the CA obtained from the network side may be: information of the CA obtained from a network server when the terminal accesses the network.

Figure 7:
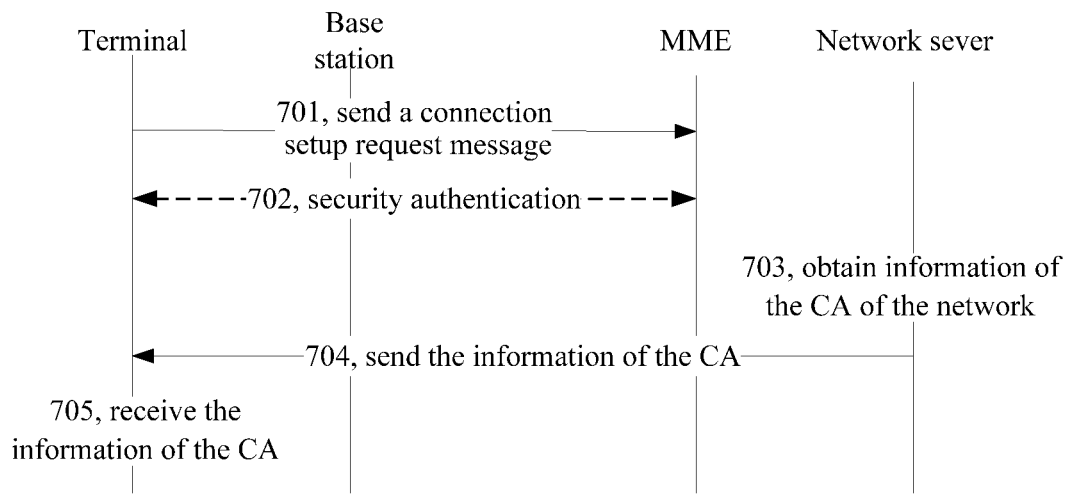
FIG. 7 is a schematic flow chart of obtaining information of a CA by a terminal from a network server of a network where the terminal locates.

When the terminal accesses the network, a process for obtaining the information of the CA from the network server is as shown in FIG. 7, including:

701, a terminal sends a connection setup request to a mobility management entity of a network where the terminal locates.

702, the terminal performs a security authentication with the mobility management entity.

703, the terminal obtains from a network server of the network where the terminal locates, information of the CA of the network.

Certainly, this is not to say that the network server obtains the information of the CA of the network only after the terminal gets access to the network and completes the security authentication, instead the information of the CA exists in the network server in advance, which may be pre-configured in the network server or may be obtained by the network server from elsewhere, this is not limited by the embodiment of the present invention specifically.

704, the network server sends the information of the CA to the terminal

705, the terminal receives the information of the CA.

Certainly, in step 704, the network server may send the information of the CA to the terminal directly, e.g., via email, may also send to the terminal in a way of sending to the base station firstly and forwarding by the base station then, selection is made according to the way of sending, which is not limited by the embodiment of the present invention specifically.

Optionally, the event message further carries the information of the CA.

The information of the CA obtained from the network side may be: information of the CA obtained from the information of the CA further carried in the event message.

Figure 8:
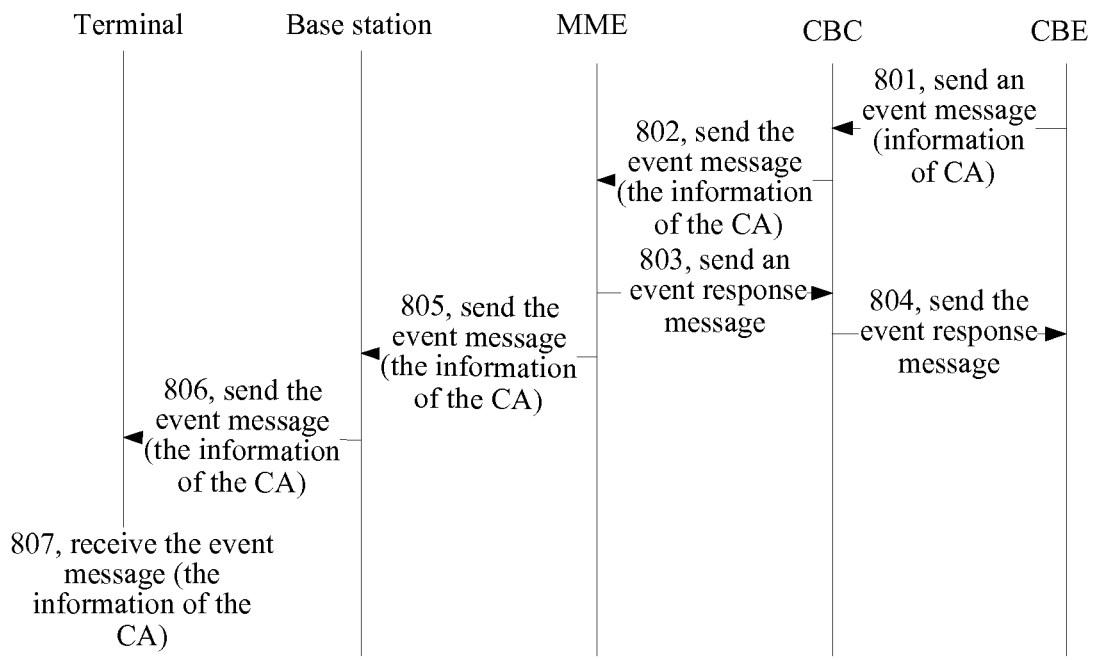
FIG. 8 is a schematic flow chart of obtaining information of a CA by a terminal from the information of the CA further carried in the event message.

A process for obtaining the information of the CA from the information of the CA further carried in the event message is as shown in FIG. 8, including:

801, a CBE sends an event message to a Cell Broadcast Centre (CBC), where the event message carries a signature of the CBE over the event message, an implicit certificate issued by a CA to the CBE and information of the CA.

The information of the CA is used to obtain a public key of the CA; the implicit certificate issued by the CA to the cell broadcast entity is used to obtain a public key of the cell broadcast entity; and the signature of the cell broadcast entity over the event message is used to verify legitimacy of the event message.

The information of the CA exists in the CBE in advance, which may be pre-configured in the CBE or may be obtained by the CBE from elsewhere; this is not limited by this embodiment specifically.

802, the CBC sends the event message to a mobility management entity MME.

803, the mobility management entity sends an event response message to the CBC.

804, the CBC sends the event response message to the CBE.

805, the mobility management entity sends the event message to a base station.

It should be noted herein, step 803 and step 805 do not have a strict sequence, here is intended to describe that after step 802 is performed, the mobility management entity receives the event message sent by the CBC, and then sends the event message to the base station, and moreover, needs to send the event response message to the CBE via the CBC.

806, the base station sends the event message to a terminal

807, the terminal receives the event message, where the event message carries the signature of the CBE over the event message, the implicit certificate issued by the CA to the CBE and the information of the CA.

The embodiments of the present invention provide a method for message verification. In the method, after an event message sent by a cell broadcast entity is received, a public key of a CA is obtained according to pre-configured information for determining the public key of the CA and information for determining the public key of the CA and obtained from a network side, or according to information of the CA obtained from the network side; then, a public key of the cell broadcast entity is obtained according to the public key of the CA obtained and an implicit certificate of the cell broadcast entity; then a signature of the cell broadcast entity over the event message is verified according to the public key of the cell broadcast entity; and finally, legitimacy of the event message is determined according to a result of the verification.

In this method, since a terminal is pre-configured with information for determining a public key of a CA, or the terminal may obtain the information for determining the public key of the CA from a network side, thus, the terminal can determine the public key of the CA according to the information for determining the public key of the CA and then perform event message verification, instead of searching the public key of the CA by trying one by one when not knowing which CA's public key to use to complete the event message verification. Therefore, the time is saved, and the timeliness of the event message verification is improved.

Embodiment 3

Figure 9:
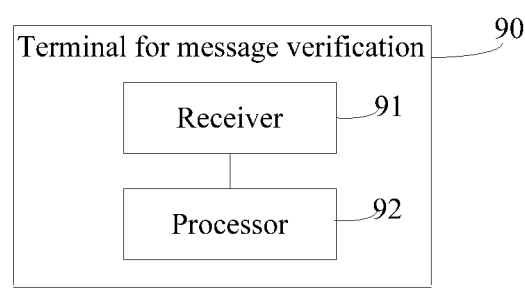
FIG. 9 is a schematic structure diagram of a terminal for message verification provided by an embodiment of the present invention.

An embodiment of the present invention provides a terminal 90 for message verification, and, specifically as shown in FIG. 9, the terminal includes a receiver 91 and a processor 92.

The receiver 91 is configured to receive an event message sent by a cell broadcast entity, and send the event message to the processor 92, where the event message carries a signature of the cell broadcast entity over the event message and an implicit certificate issued by a certification authority CA to the cell broadcast entity.

The event message may be a public warning message or other messages carrying the implicit certificate, which is not limited by the embodiment of the present invention specifically.

The implicit certificate issued by the CA to the cell broadcast entity is used to obtain a public key of the cell broadcast entity; and the signature of the cell broadcast entity over the event message is used to verify legitimacy of the event message.

The processor 92 is configured to receive the event message sent by the receiver 91, and obtain a public key of the CA according to pre-configured information for determining the public key of the CA and information for determining the public key of the CA and obtained from a network side, or according to information of the CA obtained from the network side.

The public key of the CA may be obtained according to the pre-configured information for determining the public key of the CA and information for determining the public key of the CA and obtained from a network side, and the public key of the CA may also be obtained according to the information of the CA obtained from the network side.

The pre-configured information for determining the public key of the CA may be a corresponding relationship between identification information of the cell broadcast entity and the information of the CA, at this time it needs to combine with the identification information of the cell broadcast entity obtained from the network side to obtain the public key of the CA; may also be a corresponding relationship between information of a geographical position of the CA and the information of the CA, at this time it requires a combination of the information of the geographical position of the cell broadcast entity as obtained from the network side to obtain the public key of the CA; the pre-configured information for determining the public key of the CA may also be other pre-configured information, as long as the public key of the CA could be determined by the pre-configured information, which is not limited by the embodiment of the present invention specifically.

The information of the CA obtained from the network side may be: information of the CA obtained from a core network entity or an access network entity or a network side server when a terminal accesses a network, may also be information of the CA obtained from the information of the CA further carried in the event message sent by the cell broadcast entity, and may also be obtained from other network devices having the information of the CA, as long as the network side has the information of the CA, the terminal can obtain the information of the CA, this is not limited by the embodiment of the present invention. The public key of the CA may be obtained according to the information of the CA.

The core network entity may be different according to different application scenarios, which may be an MME in a LTE network, and may also be an MSC in a GSM network or a core network entity in other networks; this is not limited by the embodiment of the present invention specifically.

The access network entity may be a base station, which is not limited by the embodiment of the present invention specifically.

The information of the CA may be an ID identification of the CA, and may also be identification of a public key of the CA or a public key of the CA, which is not limited by embodiments of the present invention specifically.

The processor 92 is also configured to obtain a public key of the cell broadcast entity according to the obtained public key of the CA and the implicit certificate of the cell broadcast entity.

The public key of the cell broadcast entity may be calculated via an operation between the public key of the CA and the implicit certificate of the cell broadcast entity, and then the public key of the cell broadcast entity is obtained.

The processor 92 is also configured to verify the signature of the cell broadcast entity over the event message according to the public key of the cell broadcast entity.

The processor 92 is also configured to determine legitimacy of the event message according to a result of the verification.

If the obtained public key of the cell broadcast entity is consistent with the signature of the cell broadcast entity over the event message, then it is determined that the event message is legitimate. A terminal may choose to inform a user of the event message in a way of displaying on the terminal, and may also inform the user in a way of an alarm ring, the embodiments of the present invention are intended to verify whether the event message is legitimate, and will not limit ways hereafter specifically.

If the obtained public key of the cell broadcast entity is not consistent with the signature of the cell broadcast entity over the event message, then it is determined that the event message is not legitimate. A terminal may choose not to process the event message, which is not limited by the embodiment of the present invention specifically.

It should be noted herein, the terminal may be applicable to not only the verification of the message of the PWS, but also applicable to any scenario where signature information is not included in the implicit certificate.

Optionally, the implicit certificate further carries identification information of the cell broadcast entity.

The pre-configured information for determining the public key of the CA specifically includes:

a corresponding relationship between the identification information of the cell broadcast entity and the information of the CA.

The obtaining, by the processor 92, according to the pre-configured information for determining the public key of the CA and the information for determining the public key of the CA and obtained from the network side, the public key of the CA specifically includes:

obtaining the information of the CA corresponding to the identification information of the cell broadcast entity according to the identification information of the cell broadcast entity carried by the implicit certificate and the pre-configured corresponding relationship between the identification information of the cell broadcast entity and the information of the CA, and then obtaining the public key of the CA.

Specifically, if the pre-configured information for determining the public key of the CA is a corresponding relationship between the identification information of the cell broadcast entity and the information of the CA, reference may be made to descriptions of step 202 in the embodiment 2 for the method of obtaining the public key of the CA according to the pre-configured information for determining the public key of the CA and the information for determining the public key of the CA and obtained from the network side, which will not be repeated by the embodiment of the present invention.

Optionally, the information that is for determining the public key of the CA and is obtained from the network side, specifically, is information of a geographical position of the cell broadcast entity.

The pre-configured information for determining the public key of the CA specifically includes:

a corresponding relationship between information of a geographical position of the CA and the information of the CA.

The obtaining, by the processor, according to the pre-configured information for determining the public key of the CA and the information for determining the public key of the CA and obtained from the network side, the public key of the CA, specifically includes:

obtaining the information of the geographical position of the CA according to the information of the geographical position of the cell broadcast entity;

obtaining the information of the CA corresponding to the geographical position of the CA according to the obtained information of the geographical position of the CA and the pre-configured corresponding relationship between the information of the geographical position of the CA and the information of the CA, and further obtaining the public key of the CA.

Specifically, if the pre-configured information for determining the public key of the CA is a corresponding relationship between information of the geographical position of the CA and the information of the CA, reference may be made to the description of step 302 in embodiment 2 for the method of determining the public key of the CA according to the pre-configured information for determining the public key of the CA and information for determining the public key of the CA and obtained from the network side, which will not be repeated by the embodiment of the present invention.

Optionally, the information of the CA obtained from the network side includes: information of the CA obtained from a core network entity or an access network entity or a network side server when a terminal accesses the network.

Specifically, when the terminal accesses the network, for a process for obtaining the information of the CA from the core network entity, reference may be made to the process as shown in FIG. 5 of the embodiment 2, which will not be repeated by the embodiment of the present invention.

Specifically, when the terminal accesses the network, for a process for obtaining the information of the CA from the access network entity, reference may be made to the process as shown in FIG. 6 of the embodiment 2, which will not be repeated by the embodiment of the present invention.

Specifically, when the terminal accesses the network, for a process for obtaining the information of the CA from the network server, reference may be made to the process as shown in FIG. 7 of the embodiment 2, which will not be repeated by the embodiment of the present invention.

Optionally, the event message further carries the information of the CA;

the information of the CA obtained from the network side includes: information of the CA obtained from the information of the CA further carried in the event message.

Specifically, for a process for obtaining the information of the CA from the information of the CA further carried in the event message, reference may be made to the process as shown in FIG. 8 of the embodiment 2, which will not be repeated by the embodiment of the present invention.

Optionally, the information of the CA includes an identification number of the CA or identification of a public key of the CA or the public key of the CA.

The embodiment of the present invention provides a terminal for message verification, where the terminal includes a receiver and a processor. Firstly, after receiving an event message sent by a cell broadcast entity, the receiver sends the event message to the processor, the processor obtains a public key of a CA according to pre-configured information for determining the public key of the CA and information for determining the public key of the CA and obtained from a network side, or according to information of the CA obtained from the network side; then, the processor obtains a public key of the cell broadcast entity according to the obtained public key of the CA and an implicit certificate of the cell broadcast entity; then the processor verifies a signature of the cell broadcast entity over the event message according to the public key of the cell broadcast entity; and finally, the processor determines legitimacy of the event message according to a result of the verification.

Since a terminal is pre-configured with information for determining a public key of a CA, or the terminal may obtain the information for determining the public key of the CA from a network side, thus, after the terminal can determine a public key of the CA according to the information for determining the public key of the CA and perform event message verification, instead of searching the public key of the CA by trying one by one when not knowing which CA's public key to use to complete the event message verification. Therefore, the time is saved, and the timeliness of the event message verification is improved The above descriptions are only the embodiments of the present invention, while the protection scope of the present invention is not limited thereto. Any modifications or replacements within the technical scope disclosed in the present invention that may be readily envisaged of by persons familiar with the technical field shall fall into the protection scope of present invention. Therefore, the protection scope of the present invention is subject to the protection scope of the claims.

What is claimed is:

1. A method for public warning system (PWS) message verification, the method comprising:

receiving, by a terminal, an event message sent by a cell broadcast entity, wherein the event message carries a signature of the cell broadcast entity over the event message and an implicit certificate issued by a certification authority (CA) to the cell broadcast entity;

obtaining, by the terminal, information for determining a public key of the CA from a network side;

obtaining, by the terminal, according to pre-configured information for determining the public key of the CA and the information for determining the public key of the CA and obtained from the network side, the public key of the CA corresponding to the implicit certificate of the cell broadcast entity, without selecting the public key of the CA from public keys of CAs saved locally;

calculating, by the terminal, according to the obtained public key of the CA and the implicit certificate of the cell broadcast entity, a public key of the cell broadcast entity;

verifying, by the terminal, according to the public key of the cell broadcast entity, the signature of the cell broadcast entity over the event message; and determining, by the terminal, according to a result of the verifying, legitimacy of the event message;

wherein, when the information for determining the public key of the CA and obtained from the network side comprises identification information of the cell broadcast entity carried in the implicit certificate, and the pre-configured information for determining the public key of the CA comprises a corresponding relationship between the identification information of the cell broadcast entity and the information of the CA, the obtaining, by the terminal, according to pre-configured information for determining a public key of the CA and information for determining the public key of the CA and obtained from a network side, the public key of the CA, comprises:

obtaining, by the terminal, according to the identification information of the cell broadcast entity carried by the implicit certificate and the pre-configured corresponding relationship between the identification information of the cell broadcast entity and the information of the CA, the information of the CA corresponding to the identification information of the cell broadcast entity, and then obtaining the public key of the CA;

when the information for determining the public key of the CA and obtained from the network side comprises information of a geographical position of the cell broadcast entity, and the pre-configured information for determining the public key of the CA comprises a corresponding relationship between information of a geographical position of the CA and the information of the CA, the obtaining, by the terminal, according to pre-configured information for determining a public key of the CA and information for determining the public key of the CA and obtained from a network side, the public key of the CA, comprises:

obtaining, by the terminal, according to the information of the geographical position of the cell broadcast entity, the information of the geographical position of the CA;

obtaining, by the terminal, according to the obtained information of the geographical position of the CA and the pre-configured corresponding relationship between the information of the geographical position of the CA and the information of the CA, the information of the CA corresponding to the geographical position of the CA, and then obtaining the public key of the CA.

2. The method according to claim 1, wherein, the information of the CA obtained from the network side comprises one of: information of the CA obtained from a core network entity and an access network entity or a network side server when a terminal accesses a network.

3. The method according to claim 1, wherein the information of the CA comprises one of an identification of the CA, and an identification of the public key of the CA, or the public key of the CA.

4. The method according to claim 1, wherein, the event message further carries the information of the CA; and the information of the CA obtained from the network side comprises: information of the CA obtained from the information of the CA further carried in the event message.

5. A terminal for public warning system (PWS) message verification, wherein the terminal comprises a receiver and a processor;

the receiver is configured to receive an event message sent by a cell broadcast entity, and send the event message to the processor, wherein the event message carries a signature of the cell broadcast entity over the event message and an implicit certificate issued by a certification authority (CA) to the cell broadcast entity;

the processor is configured to:

receive the event message sent by the receiver, obtain information for determining a public key of the CA from a network side, and obtain, according to pre-configured information for determining the public key of the CA and the information for determining the public key of the CA and obtained from a network side, the public key of the CA corresponding to the implicit certificate of the cell broadcast entity, without selecting the public key of the CA from public keys of CAs saved locally;

calculate, according to the obtained public key of the CA and the implicit certificate of the cell broadcast entity, a public key of the cell broadcast entity;

verify, according to the public key of the cell broadcast entity, the signature of the cell broadcast entity over the event message; and determine, according to a result of the verifying legitimacy of the event message;

wherein, when the information for determining the public key of the CA and obtained from the network side comprises identification information of the cell broadcast entity carried in the implicit certificate, and the pre-configured information for determining the public key of the CA comprises a corresponding relationship between the identification information of the cell broadcast entity and the information of the CA, the obtain, according to pre-configured information for determining a public key of the CA and information for determining the public key of the CA and obtained from a network side, the public key of the CA, comprises:

obtaining, according to the identification information of the cell broadcast entity carried by the implicit certificate and the pre-configured corresponding relationship between the identification information of the cell broadcast entity and the information of the CA, the information of the CA corresponding to the identification information of the cell broadcast entity, and then obtaining the public key of the CA;

when the information for determining the public key of the CA and obtained from the network side comprises information of a geographical position of the cell broadcast entity and the pre-configured information for determining the public key of the CA comprises a corresponding relationship between information of a geographical position of the CA and the information of the CA, the obtain, according to pre-configured information for determining a public key of the CA and information for determining the public key of the CA and obtained from a network side, the public key of the CA, comprises:

obtaining, according to the information of the geographical position of the cell broadcast entity, the information of the geographical position of the CA;

obtaining, according to the obtained information of the geographical position of the CA and the pre-configured corresponding relationship between the information of the geographical position of the CA and the information of the CA, the information of the CA corresponding to the geographical position of the CA, and then obtaining the public key of the CA.

6. The terminal according to claim 5, wherein, the information of the CA obtained from the network side comprises one of: information of the CA obtained from a core network entity and an access network entity or a network side server when a terminal accesses the network.

7. The terminal according to claim 5, wherein,
the information of the CA comprises one of an identification number of the CA, an identification of the public key of the CA, and the public key of the CA.

8. The terminal according to claim 5, wherein, the event message further carries the information of the CA; the information of the CA obtained from the network side comprises: information of the CA obtained from the information of the CA further carried in the event message.

\* \* \* \* \*